(12) United States Patent
Iwami et al.

(10) Patent No.: US 7,890,839 B2
(45) Date of Patent: Feb. 15, 2011

(54) RADIO COMMUNICATION APPARATUS SUPPRESSING CORRECTION ERROR WHILE MAINTAINING COMMUNICATION QUALITY, AND METHOD AND PROGRAM FOR ERROR CORRECTION

(75) Inventors: Masashi Iwami, Gifu (JP); Takeo Miyata, Gifu (JP); Tadayoshi Ito, Hashima (JP)

(73) Assignee: Kyocera Corporation, Kyoto (JP)

( * ) Notice: Subject to any disclaimer, the term of this patent is extended or adjusted under 35 U.S.C. 154(b) by 877 days.

(21) Appl. No.: 10/981,471

(22) Filed: Nov. 5, 2004

(65) Prior Publication Data
US 2005/0108597 A1   May 19, 2005

(30) Foreign Application Priority Data
Nov. 18, 2003   (JP) .............................. 2003-387831

(51) Int. Cl.
H03M 13/00 (2006.01)
(52) U.S. Cl. ....................................... 714/774; 714/780
(58) Field of Classification Search ................. 714/780, 714/774; H03M 13/45
See application file for complete search history.

(56) References Cited

U.S. PATENT DOCUMENTS

| | | | |
|---|---|---|---|
| 5,898,708 A | | 4/1999 | Tateishi et al. |
| 5,987,020 A * | | 11/1999 | Abe ........................... 370/347 |
| 6,163,873 A | | 12/2000 | Murano |
| 6,230,255 B1 * | | 5/2001 | Asghar et al. .................. 712/32 |
| 6,760,699 B1 * | | 7/2004 | Weerackody et al. ........ 714/780 |
| 7,133,477 B2 | | 11/2006 | Yellin et al. |
| 7,203,894 B2 * | | 4/2007 | Pan et al. ..................... 714/780 |
| 2001/0055959 A1 * | | 12/2001 | Shen et al. ............... 455/277.1 |
| 2002/0168039 A1 * | | 11/2002 | Miyanaga et al. ........... 375/347 |
| 2003/0026366 A1 * | | 2/2003 | Matsui et al. ............... 375/347 |
| 2003/0140303 A1 * | | 7/2003 | Litwin et al. ................ 714/785 |

FOREIGN PATENT DOCUMENTS

| | | |
|---|---|---|
| JP | 64-016028 | 1/1989 |
| JP | 10-341434 | 12/1989 |
| JP | 02-299324 | 12/1990 |
| JP | 06-120908 | 4/1994 |
| JP | 7-264077 | 10/1995 |
| JP | 8-008760 | 1/1996 |
| JP | 10-190631 | 7/1998 |
| JP | 11-027243 | 1/1999 |
| JP | 11-088957 | 3/1999 |

(Continued)

OTHER PUBLICATIONS

H. Imai, "Code Theory," Chapter 2: Fundamental Concept of Code Theory, The Institute of Electronics, Information and Communication Engineers, pp. 24-25 and partial English translation., Mar. 15, 1990.

*Primary Examiner*—Sam Rizk
(74) *Attorney, Agent, or Firm*—Foley & Lardner LLP

(57) ABSTRACT

An RSSI detection unit detects a level of a received signal. An error detection unit performs error detection of the received signal. An error correction control unit causes an error correction unit to perform error correction of the received signal only when the error detection unit detects an error and the level of the received signal detected by the RSSI detection unit is not lower than a predetermined value.

7 Claims, 10 Drawing Sheets

FOREIGN PATENT DOCUMENTS

| | | |
|---|---|---|
| JP | 11-196037 | 7/1999 |
| JP | 2001-285163 | 10/2001 |
| JP | 2003-198511 | 7/2003 |
| TW | 227640 | 8/1994 |
| TW | 200302029 | 7/2003 |
| WO | WO-94/00938 | 1/1994 |
| WO | WO-02/073812 | 9/2002 |

\* cited by examiner

| SIGNAL POINT | WITHOUT ERROR CORRECTION | WITH ERROR CORRECTION |
|---|---|---|
| A | ○ | ○ |
| B | × | ○ |
| C | × | × |
| D | × | △ |
| E | △ | △ |

RADIO COMMUNICATION APPARATUS SUPPRESSING CORRECTION ERROR WHILE MAINTAINING COMMUNICATION QUALITY, AND METHOD AND PROGRAM FOR ERROR CORRECTION

BACKGROUND OF THE INVENTION

1. Field of the Invention

The present invention relates to a radio communication apparatus, and a method and program for error correction. More particularly, the present invention relates to a radio communication apparatus having an error correcting function, and a method and program for error correction.

2. Description of the Background Art

With advance in communication systems, error correction has been increasingly adapted for the purpose of improving communication qualities. A method for error correction is described, e.g., in Hideki Imai, "Code Theory", The Institute of Electronics, Information and Communication Engineers, pp. 24-25, Mar. 15, 1990.

Using the error correction enables accurate recovery of a transmitted signal from a received signal under a certain condition in such a case that noise occurs in the communication path, causing a difference between the bits of the received signal and the transmitted signal.

Error correction, however, not only provides the above-described benefits, but may also cause detriments as follows.

In the error correction, a transmitted signal is estimated from a received signal. From the standpoint of a space of the received signal, the space of the received signal is divided in advance into regions corresponding to the respective transmitted signals, as shown in FIG. 13, and the transmitted signal is estimated by checking in which region the received signal has entered.

Referring to FIG. 13, the region denoted by (1) is a region (correction region for signal point A) corresponding to the transmitted signal of signal point A. The received signal having entered this region is estimated to be the signal of signal point A by conducting error correction.

The region denoted by (2) is a region (correction region for signal point E) corresponding to the transmitted signal of signal point E. The received signal having entered this region is estimated to be the signal of signal point E as a result of error correction.

The shaded region in FIG. 13 is a region (error correction failure region) corresponding to none of the transmitted signals. It is impossible to perform error correction on the received signal having entered this region.

FIG. 14 shows presence/absence of an error in a received signal and success/failure of recognition of the error, in the case where a signal of signal point A transmitted is received at respective signal points A-E of FIG. 13, for two separate cases of performing and not performing error correction.

In FIG. 14, the symbol ○ indicates that a correct signal is obtained, x indicates that an incorrect signal is obtained and the error is recognized, and Δ indicates that an incorrect signal is obtained and it is falsely recognized that there is no error.

When the signal point of the received signal corresponds to signal point A, a correct signal (signal of signal point A) is obtained whether or not error correction is conducted.

When the signal point of the received signal corresponds to signal point B, it is recognized that there is an error, and an incorrect signal is obtained unless error correction is conducted. Since signal point B is included in the correction region for signal point A, a correct signal (signal of signal point A) can be obtained by conducting error correction.

When the signal point of the received signal corresponds to signal point C, it is recognized that there is an error. A correct signal cannot be obtained, since signal point C is included in the error correction failure region where error correction cannot be performed.

When the signal point of the received signal corresponds to signal point D, it is recognized that there is an error and an incorrect signal is obtained when error correction is not conducted. Since signal point D is included in the correction region for signal point E, when error correction is conducted, an incorrect signal (signal of signal point E) is obtained and it is falsely recognized that there is no error.

When the signal point of the received signal corresponds to signal point E, if error correction is not conducted, an incorrect signal (signal of signal point E) is obtained and it is falsely recognized that there is no error. Even if error correction is conducted, since signal point E is included in the correction region for signal point E, an incorrect signal (signal of signal point E) is obtained and it is falsely recognized that there is no error.

In the above description, the state indicated by ○ (where a correct signal is obtained) is called "correction success", and there is no problem.

The state indicated by x (where an incorrect signal is obtained and it is recognized that there is an error) is called "correction failure". In this case, the presence of an error is recognized, and thus, the reception device can refrain from conducting processing based on the erroneous signal, so that there is no adverse effect on the processing of the reception device. The reception device may instruct the transmission device to retransmit the signal, and obtain a correct signal from the retransmitted signal.

The state indicated by Δ (where an incorrect signal is obtained and it is falsely recognized that there is no error) is called "miscorrection". The reception device performs processing based on the falsely corrected signal, which may adversely affect the processing of the reception device.

SUMMARY OF THE INVENTION

Based on the foregoing, an object of the present invention is to provide a radio communication apparatus suppressing an adverse effect of the miscorrection while maintaining the best possible communication quality, and a method and program for error correction.

To solve the above-described problems, a radio communication apparatus according to the present invention includes: a reception level detection unit detecting a level of a received signal; an error detection unit performing error detection of the received signal, and a correction unit performing error correction of the received signal only when the error detection unit detects an error and when the level of the received signal detected by the reception level detection unit is not lower than a predetermined value.

Another radio communication apparatus according to the present invention includes: an array antenna including a plurality of antennas; an adaptive array signal processing unit performing adaptive array processing on signals from the array antenna to extract a received signal from a desired radio communication apparatus; an average error calculation unit obtaining an error between a reference signal and the extracted received signal in the adaptive array processing in the adaptive array signal processing unit, and calculating as an average error an average value of the obtained error during a prescribed period of time; an error detection unit performing error detection of the extracted received signal; and a correction unit performing error correction of the received signal only when the error detection unit detects an error and when the average error calculated by the average error calculation unit is not greater than a predetermined value.

Yet another radio communication apparatus according to the present invention includes: a determination unit determining a data type of a received signal, an error detection unit performing error detection of the received signal; and a correction unit performing error correction of the received signal only when the error detection unit detects an error and when the data type determined by the determination unit corresponds to a predetermined type.

Preferably, the predetermined type is voice.

The present invention also provides an error correction method for performing error correction of a received signal in a radio communication apparatus, comprising: the step of detecting a level of a received signal; the step of performing error detection of the received signal; and the step of performing error correction of the received signal only when the error is detected and when the detected level of the received signal is not lower than a predetermined value.

The present invention also provides another error correction method for performing error correction of a received signal in a radio communication apparatus having an array antenna including a plurality of antennas, comprising: the step of performing adaptive array processing on signals from the array antenna and extracting a received signal from a desired radio communication apparatus; the step of obtaining an error between a reference signal and the extracted received signal in the adaptive array processing, and calculating as an average error an average value of the obtained error during a prescribed period of time; the step of performing error detection of the extracted received signal; and the step of performing error correction of the received signal only when the error is detected and when the calculated average error is not greater than a predetermined value.

The present invention also provides yet another error correction method for performing error correction of a received signal in a radio communication apparatus, comprising: the step of determining a data type of a received signal; the step of performing error detection of the received signal; and the step of performing error correction of the received signal only when the error is detected and when the determined data type corresponds to a predetermined type.

Preferably, the predetermined type is voice.

The present invention further provides an error correction program for performing error correction of a received signal in a radio communication apparatus, causing a computer to perform: the step of detecting a level of a received signal; the step of performing error detection of the received signal; and the step of performing error correction of the received signal only when the error is detected and when the detected level of the received signal is not lower than a predetermined value.

The present invention further provides another error correction program for performing error correction of a received signal in a radio communication apparatus having an array antenna including a plurality of antennas, causing a computer to perform: the step of performing adaptive array processing on signals from the array antenna and extracting a received signal from a desired radio communication apparatus; the step of obtaining an error between a reference signal and the extracted received signal in the adaptive array processing, and calculating as an average error an average value of the obtained error during a prescribed period of time; the step of performing error detection of the extracted received signal; and the step of performing error correction of the received signal only when the error is detected and when the calculated average error is not greater than a predetermined value.

The present invention further provides yet another error correction program for performing error correction of a received signal in a radio communication apparatus, causing a computer to perform: the step of determining a data type of a received signal; the step of performing error detection of the received signal; and the step of performing error correction of the received signal only when the error is detected and when the determined data type corresponds to a predetermined type.

Preferably the predetermined type is voice.

According to the present invention, it is possible to. suppress an adverse effect of miscorrection while maintaining the best possible communication quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a flowchart illustrating operation procedure of error correction processing of radio communication apparatus 300.

DESCRIPTION OF THE PREFERRED EMBODIMENTS

Hereinafter, embodiments of the present invention will be described with reference to the drawings.

First Embodiment

The present embodiment pertains to a radio communication apparatus that performs control of error correction in accordance with a reception level.

(Signal Format)

As signals to be sent from and received at the radio communication apparatus of the present embodiment, a signal in conformity with the second-generation cordless telephone system standard (RCR-STD 28) is assumed, although the present invention is of course not limited thereto.

Figures 1, 2:
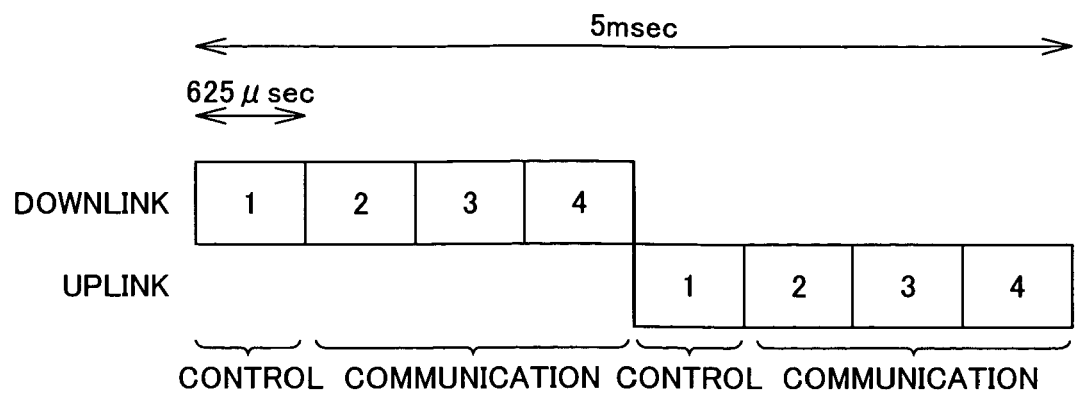
FIG. 1 shows slots in accordance with the TDMA-TDD (Time Division Multiple Access/Time Division Duplex) system.
FIG. 2 shows a configuration of a BCCH (Broadcast Control Channel).

In the RCR-STD 28, signals are transmitted according to the TDMA-TDD (Time Division Multiple Access/Time Division Duplex) system as shown in FIG. 1. In the TDMA-TDD system, one frame is formed of four pairs (uplink and downlink) of time slots (one time slot: 625 μs). The leading slot 1 is a physical slot for control, and is assigned with a control channel (CCH). Each of the succeeding three slots 2-4 is a physical slot for communication, and is assigned, e.g., with a traffic channel (TCH). Control channel CCH is used, e.g., to activate and establish traffic channel TCH. Each slot consists of 120 symbols (=240 bits).

FIG. 2 shows a configuration of a broadcast control channel (BCCH) that is one type of control channel. As shown in FIG. 2, broadcast control channel BCCH has a CRC (Cyclic Redundancy Code) of 16 bits. Similarly, the other control and traffic channels each have a CRC of 16 bits.

(Relation between Reception Level and Miscorrection)

Figure 3:
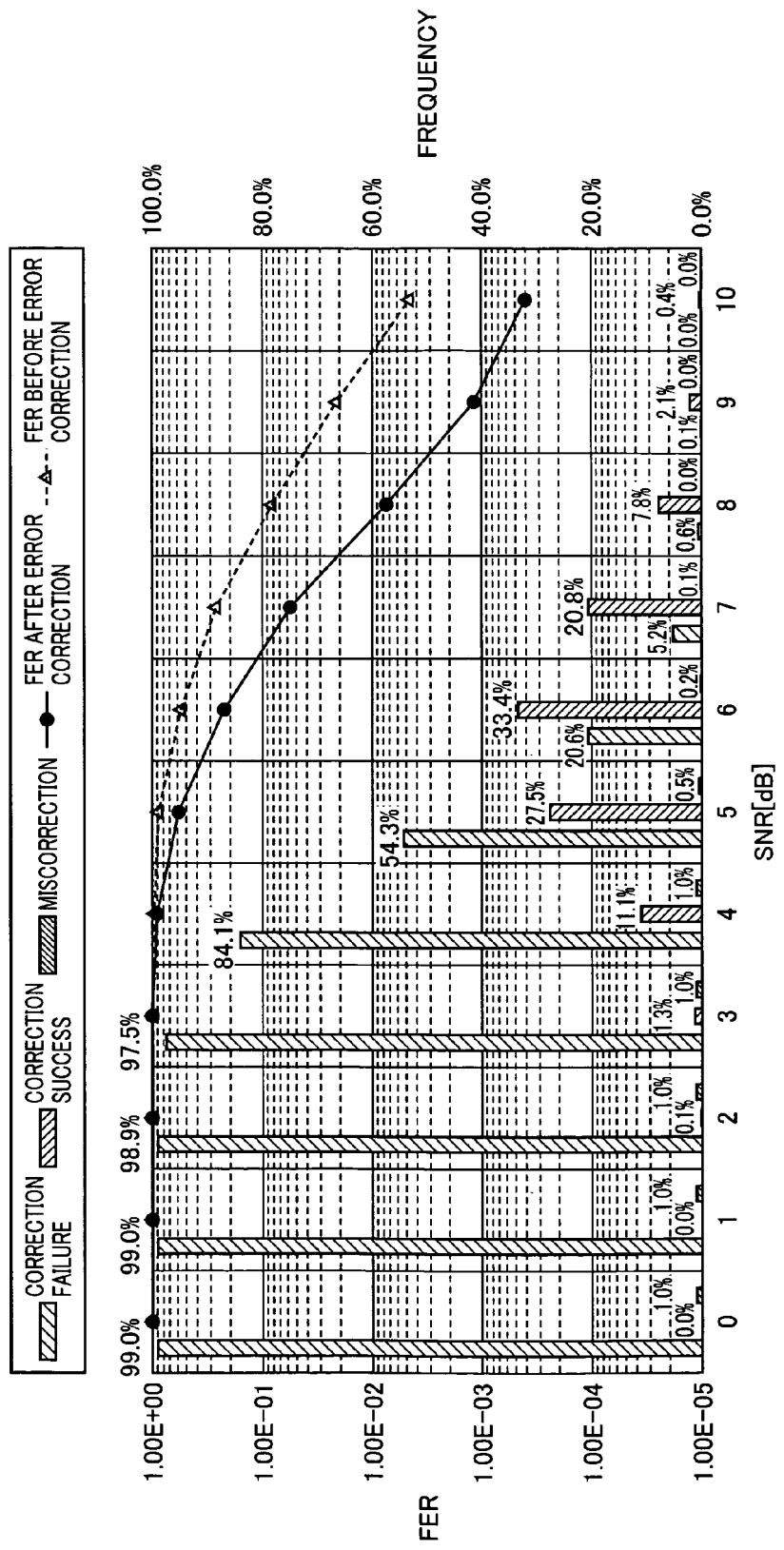
FIG. 3 shows the relation between a reception level and frequency of miscorrection.

FIG. 3 shows a simulation result of the relation between the reception level and the frequency of miscorrection. The simulation was conducted using the signal in conformity with the above-described standard RCR-STD 28. With data of 180 bits and CRC of 16 bits, a generative polynomial $G(x)=(x^{16}+x^{12}+x^5+1)$ was employed. Error correction of two bits was applied. For the modulation scheme, π/4 shift QPSK (Quadrature Phase Shift Keying) was employed, and SNR (Signal to Noise Rate) and FER (Frame Error Rate) in static characteristic were obtained.

As shown in FIG. 3, as SNR increases, FER before error correction and FER after error correction both decrease. When error correction is performed, FER after error correction becomes smaller than FER before error correction. For example, when SNR is 10, FER before error correction is 0.01, and FER after error correction is 0.0001.

On the other hand, the frequency of miscorrection increases as SNR decreases. Specifically, the frequency of miscorrection is 0% when SNR is 10 to 8, it is 0.1% when SNR is 7, 0.2% when SNR is 6, 0.5% when SNR is 5, and 1.0% when SNR is 6 to 0.

As such, it can be said that it is desirable to refrain from conducting error correction when SNR is small, i.e., when the level of the received signal is small, since the communication environment is poor and the frequency of miscorrection is high.

(Configuration)

Figure 4:
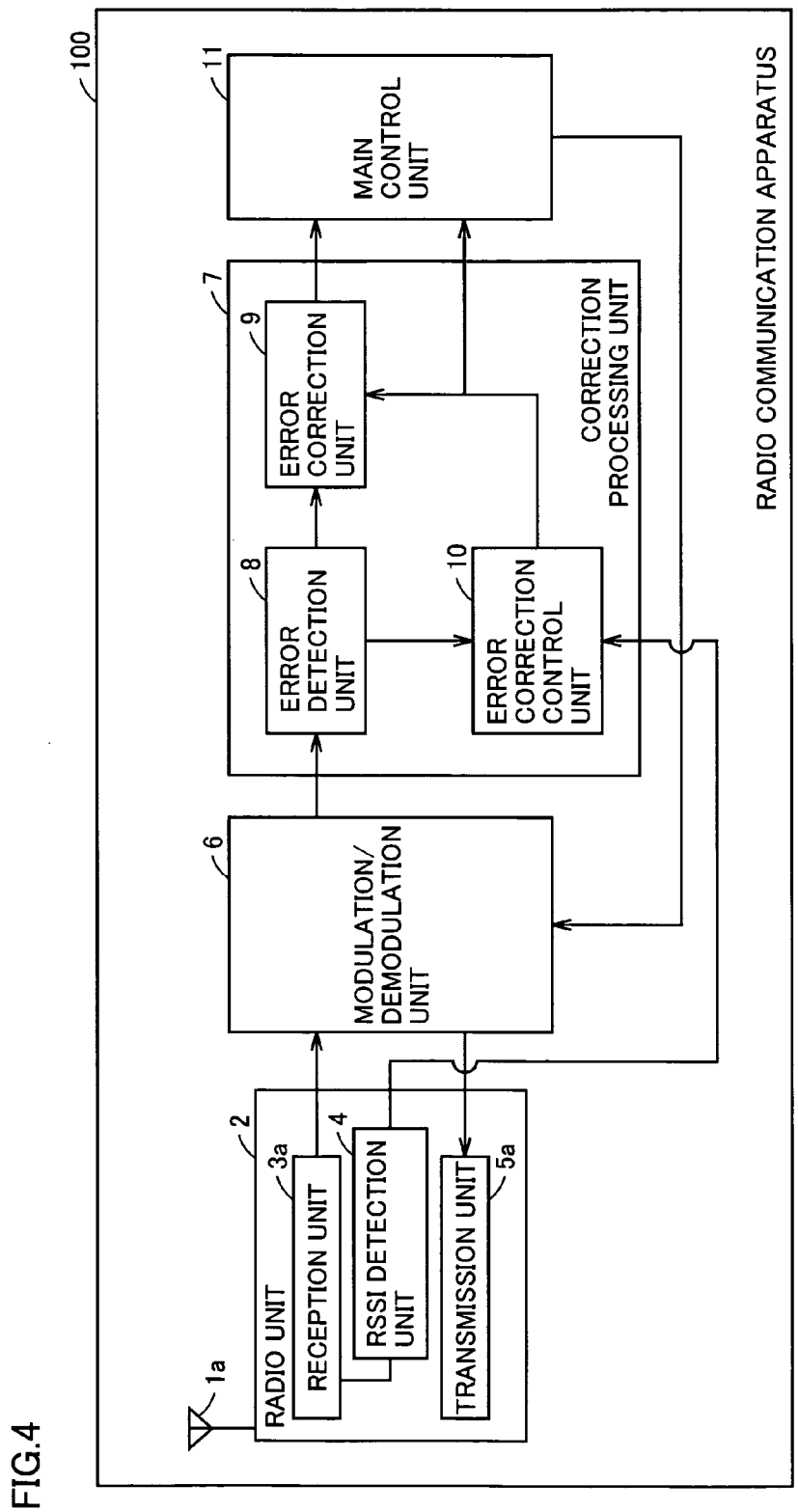
FIG. 4 is a block diagram showing a configuration of a radio communication apparatus 100 according to a first embodiment of the present invention.

FIG. 4 is a block diagram showing a configuration of a radio communication apparatus 100 according to the present embodiment. Referring to FIG. 4, the radio communication apparatus 100 includes an antenna 1a, a radio unit 2, a modulation/demodulation unit 6, a correction processing unit 7, and a main control unit 11. Radio unit 2 includes a reception unit 3a, an RSSI detection unit 4, and a transmission unit 5a. Correction processing unit 7 includes an error detection unit 8, an error correction unit 9, and an error correction control unit 10. A digital signal processor (DSP) performs the processing of modulation/demodulation unit 6, correction processing unit 7, and main control unit 11, by software. Specifically, the DSP reads and executes a program from a memory (not shown). This program may externally be installed.

Reception unit 3a performs processing, such as amplification and frequency conversion, on a radio frequency (RF) signal received at antenna 1a, and outputs the resulting signal to modulation/demodulation unit 6.

RSSI detection unit 4 detects a received signal strength indicator (RSSI) of the RF signal received at antenna 1a, and outputs an average value of RSSI detected during one time slot period (i.e., period corresponding to 120 symbols) as a reception level to error correction control unit 10.

Transmission unit 5a performs processing, such as amplification and frequency conversion, on the signal output from modulation/demodulation unit 6, and outputs the resulting signal to antenna 1a.

Modulation/demodulation unit 6 performs demodulation processing of the π/4 shift QPSK scheme on the signal output from reception unit 3a, and outputs the demodulated signal to correction processing unit 7. Modulation/demodulation unit 6 also performs modulation processing of the π/4 shift QPSK scheme on the signal output from main control unit 11, and outputs the modulated signal to transmission unit 5a.

Error detection unit 8 performs error detection on demodulated signals of one slot output from modulation/demodulation unit 6 by the cyclic redundancy check (CRC) method. Specifically, error detection unit 8 divides the demodulated signals of one slot by the generative polynomial $G(x)=(x^6+x^{12}+x^5+1)$, and outputs the remainder to error correction control unit 10.

Error correction unit 9, upon receipt of an instruction to perform error correction from error correction control unit 10, performs error correction on the demodulated signals of one slot output from modulation/demodulation unit 6, and outputs the demodulated signals of one slot having undergone the error correction to main control unit 11. When receiving an instruction not to perform error correction from error correction control unit 10, error correction unit 9 does not perform error correction on the demodulated signals of one slot output from modulation/demodulation unit 6, and outputs the same as they are to main control unit 11.

Error correction control unit 10 sends the instruction to perform error correction to error correction unit 9 when the remainder received from error detection unit 8 is not 0 (i.e., there is an error) and when the reception level received from RSSI detection unit 4 is not lower than a prescribed value α. Error correction control unit 10 sends the instruction to refrain from conducting error correction to error correction unit 9 when the remainder obtained from error detection unit 8 is 0 (i.e., there is no error) or when the reception level obtained from RS SI detection unit 4 is less than the prescribed value α.

(Operation)

Hereinafter, an operation of radio communication apparatus 100 for error correction processing is described.

Figure 5:
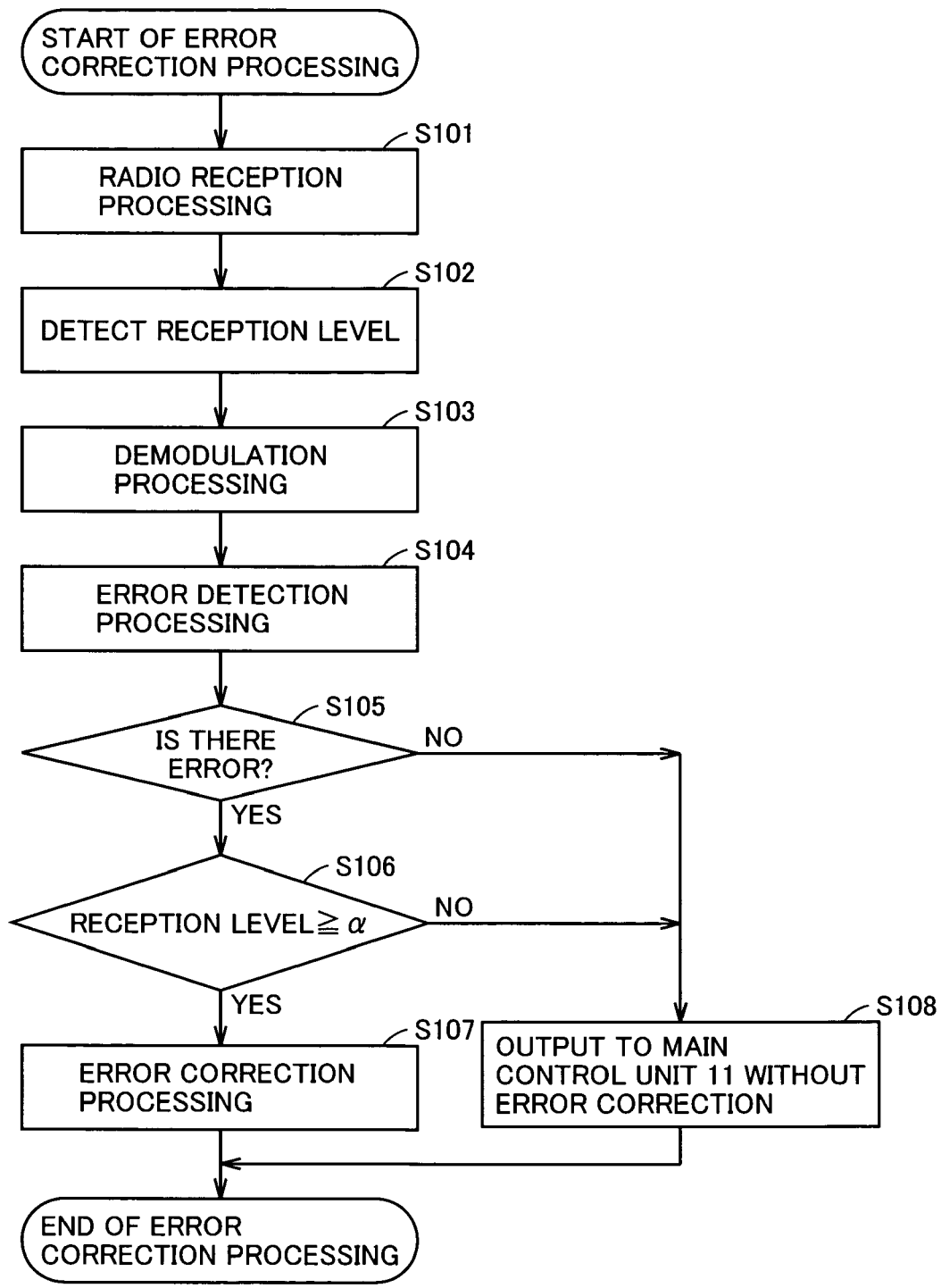
FIG. 5 is a flowchart illustrating operation procedure of error correction processing of radio communication apparatus 100.

FIG. 5 is a flowchart illustrating operation procedure of the error correction processing of radio communication apparatus 100.

Referring to FIG. 5, firstly, reception unit 3a performs radio reception processing, such as amplification and frequency conversion, on an RF signal received at antenna 1a, and outputs the resulting signal to modulation/demodulation unit 6 (S101).

RSSI detection unit 4 detects RSSI of the RF signal received at antenna 1a, obtains an average value of RSSI detected during one time slot period (corresponding to 120 symbols), and outputs the average value as a reception level to error correction control unit 10 (S102).

Next, modulation/demodulation unit 6 performs demodulation processing of the π/4 shift QPSK scheme on the signal output from reception unit 3a, and outputs the demodulated signal to correction processing unit 7 (S103).

Error detection unit 8 divides the demodulated signals of one slot output from modulation/demodulation unit 6 by the generative polynomial $G(x)=(x^{16}+x^{12}+x^5+1)$, and outputs the remainder to error correction control unit 10 (S104).

Error correction control unit 10 sends an instruction to perform error correction to error correction unit 9 when the remainder sent from error detection unit 8 is not 0 (i.e., there is an error) and when the reception level sent from RSSI detection unit 4 is not lower than a prescribed value α. When receiving the instruction to perform error correction from error correction control unit 10, error correction unit 9 performs error correction on the demodulated signals of one slot output from modulation/demodulation unit 6, and outputs the demodulated signals of one slot having undergone the error correction to main control unit 11 (S105, S106, S107).

Error correction control unit 10 sends an instruction not to perform error correction to error correction unit 9 when the remainder received from error detection unit 8 is 0 (i.e., there is no error) or the reception level sent from RSSI detection unit 4 is lower than the prescribed value α. Upon receipt of the instruction to refrain from conducting error correction from error correction control unit 10, error correction unit 9 does not perform error correction on the demodulated signals of one slot output from modulation/demodulation unit 6, and outputs the signals as they are to main control unit 11 (S105, S106, S108).

As described above, according to the present embodiment, focusing on the fact that with a low reception level, communication environment is poor and thus miscorrection is likely to occur, radio communication apparatus 100 is configured to perform error correction only when an error is detected and when the reception level is not lower than a prescribed value α. This can reduce the frequency of miscorrection.

Second Embodiment

The present embodiment pertains to a radio communication apparatus that performs control of error correction in accordance with a size of error in adaptive array signal processing.

(Configuration)

Figure 6:
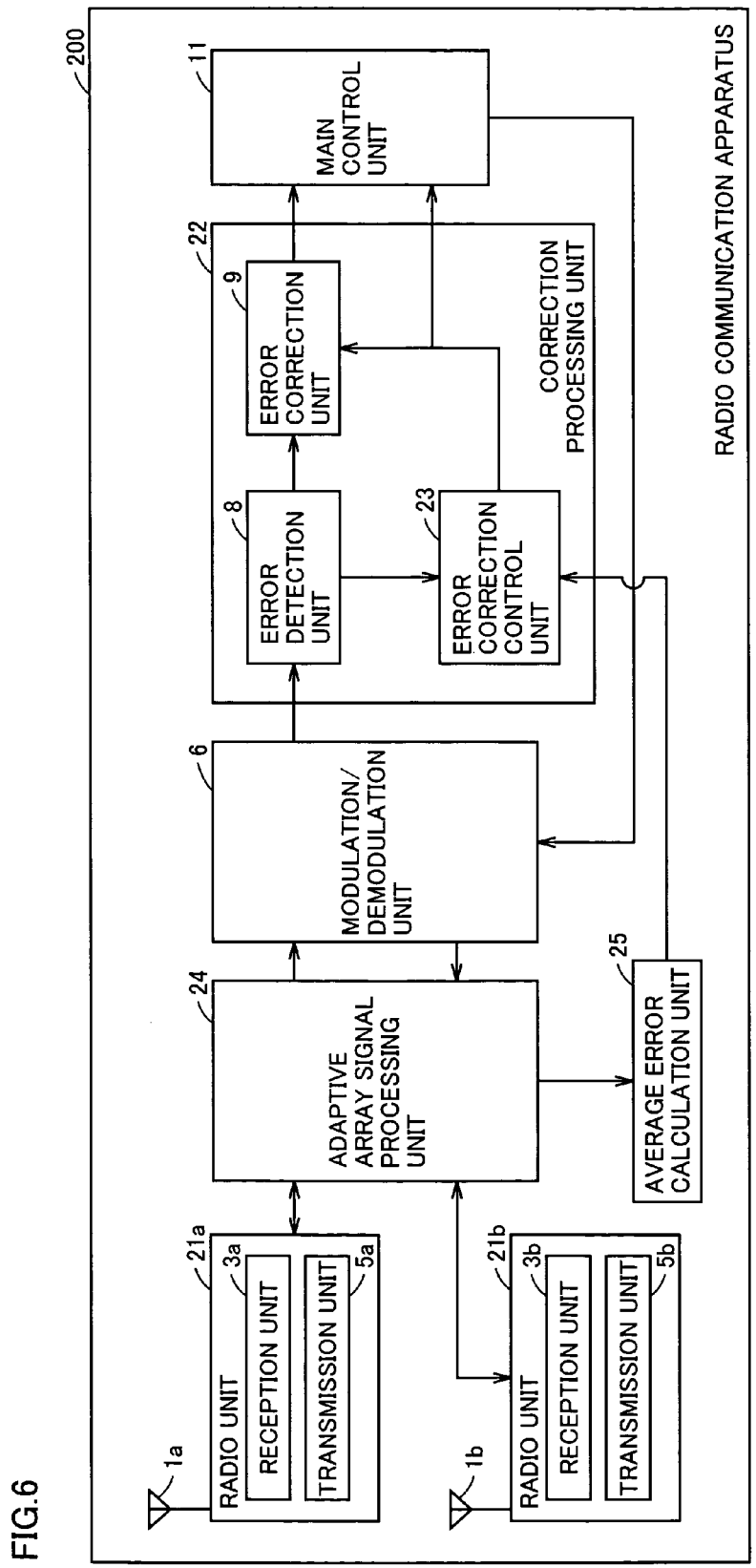
FIG. 6 is a block diagram showing a configuration of a radio communication apparatus 200 according to a second embodiment of the present invention.

FIG. 6 is a block diagram showing a configuration of a radio communication apparatus 200 according to the present embodiment. Referring to FIG. 6, radio communication apparatus 200 includes antennas 1a, 1b, radio units 21a, 21b, an adaptive array signal processing unit 24, an average error calculation unit 25, a modulation/demodulation unit 6, a correction processing unit 22, and a main control unit 11. Radio unit 21a includes a reception unit 3a and a transmission unit 5a, and radio unit 21b includes a reception unit 3b and a transmission unit 5b. Correction processing unit 7 includes an error detection unit 8, an error correction unit 9, and an error correction control unit 23. A DSP performs the processing of adaptive array signal processing unit 24, average error calculation unit 25, modulation/demodulation unit 6, correction processing unit 22 and main control unit 11, by software. Specifically, the DSP reads and executes a program from a memory (not shown). The program may be installed externally.

Of these components, modulation/demodulation unit 6, error detection unit 8, error correction unit 9 and main control unit 11 are identical to those of the first embodiment shown in FIG. 4, and thus, description thereof is not repeated here. Hereinafter, the components different from those of the first embodiment will be described.

Reception units 3a, 3b perform processing such as amplification and frequency conversion on RF signals received at antennas 1a, 1b, respectively, and output the resulting signals to adaptive array signal processing unit 24.

Transmission units 5a, 5b perform processing such as amplification and frequency conversion on the signals output from adaptive array signal processing unit 24, and output the resulting signals to antennas 1a, 1b, respectively.

Adaptive array signal processing unit 24 performs adaptive array processing on the received signals supplied from reception units 3a, 3b, and outputs the resulting signals to modulation/demodulation unit 6. Adaptive array signal processing unit 24 also performs adaptive array processing on the transmission signals supplied from modulation/demodulation unit 6, and outputs the resulting signals to transmission units 5a, 5b.

Figure 7:
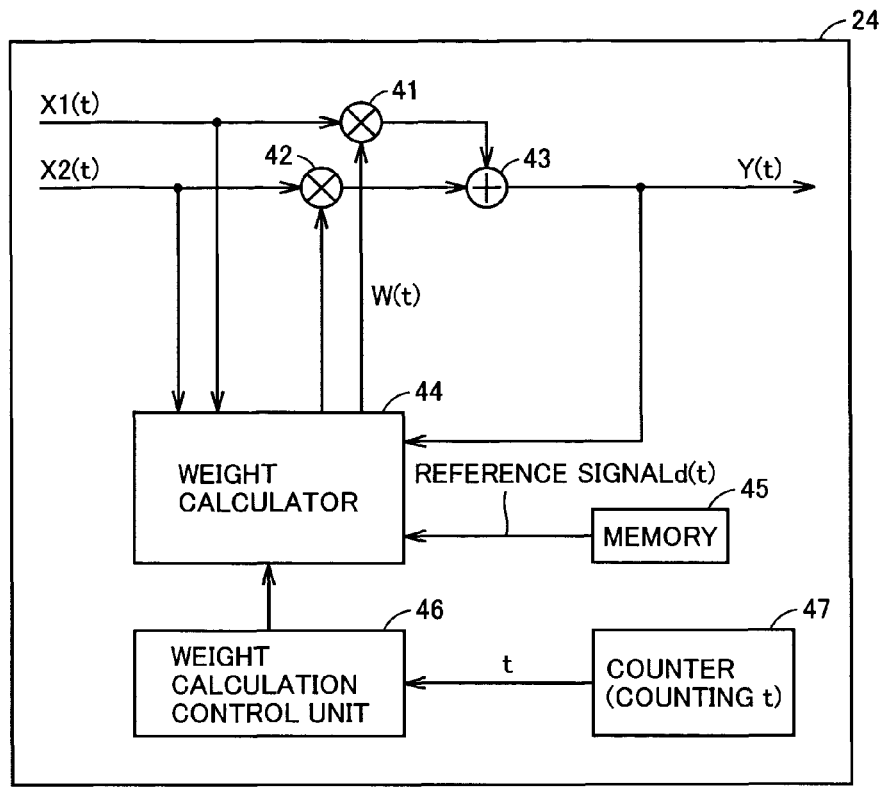
FIG. 7 is a block diagram showing a detailed configuration of the adaptive array signal processing unit 24.

FIG. 7 is a block diagram showing a detailed configuration of adaptive array signal processing unit 24. The received signals of antennas 1a, 1b, amplified by respective reception units 3a, 3b in FIG. 6, are converted to digital signals by an A/D converter (not shown).

These digital signals are provided to the DSP of the radio communication apparatus, and are subsequently subjected to adaptive array processing by software in accordance with the functional block diagram of FIG. 7.

In the adaptive array processing, based on a received signal, weight vectors consisting of reception coefficients (weights) for the respective antennas are calculated for adaptive control, so as to accurately extract a signal from a desired mobile terminal device.

Returning to FIG. 7, received signal vectors X(t) (=X1(t), X2(t)) are provided to respective one inputs of multipliers 41, 42 as well as to a weight calculator 44.

Weight calculator 44 calculates weight vectors W(t) consisting of the weights for the respective antennas in accordance with an algorithm as will be described later, and provides the same to the respective other inputs of multipliers 41, 42 for complex multiplication by the received signal vectors X(t) from the corresponding antennas.

An adder 43 obtains a total sum Y(t) of the multiplication results, which is expressed as a complex multiplication sum as follows:

$$Y(t)=W(t)^H X(t)$$

where $W(t)^H$ represents transpose of a complex conjugate of weight vector W(t).

The result Y(t) of the complex multiplication sum as described above is provided to weight calculator 44.

In a time period where a reference signal is already known, weight calculator 44 obtains error e(t) between Y(t) and the already-known reference signal d(t) that is stored in advance in a memory 45. Reference signal d(t) is an already-known signal in the form of a preamble or a unique word.

In a time period where a reference signal is unknown, weight calculator 44 performs inverse operation to obtain the reference signal d(t) from the complex multiplication sum of a weight vector W(t−1) of a preceding symbol and received signal X(t). More specifically, weight calculator 44 assumes d'(t)=Det[W(t−1)$^H$X(t)], and selects a signal reference point of π/4 shift QPSK having a shortest Euclidean distance from the signal point, and determines the relevant signal reference point as reference signal d(t). Weight calculator 44 then obtains error e(t) between Y(t) and the d(t) thus obtained by the inverse operation.

Weight calculator 44 performs processing to update the weight coefficients so as to decrease a square of the calculated error e(t) (=Y(t)−d(t)) under the control of a weight calculation control unit 46. In the adaptive array processing, update of the weight vectors (weight learning) is performed adaptively in accordance with time and fluctuation in property of the signal radio wave propagation path, so as to eliminate interfering components from received signals X(t) to thereby extract signal Y(t) from a desired mobile terminal device.

Although not shown in FIG. 7, transmission signals modulated and output from modulation/demodulation unit 6 of FIG. 6 are processed into two systems of transmission signals weighted with complex multiplication by the weight vectors calculated by weight calculator 44, and are provided to transmission units 5a, 5b. The transmission signals provided to transmission units 5a, 5b are subjected to amplification and frequency conversion, and then sent out via antennas 1a, 1b, respectively.

Description is now made as to how the error e(t) between reference signal d(t) and complex multiplication sum Y(t) calculated by adaptive array signal processing unit 24 differs dependent on the communication environment.

Figure 8:
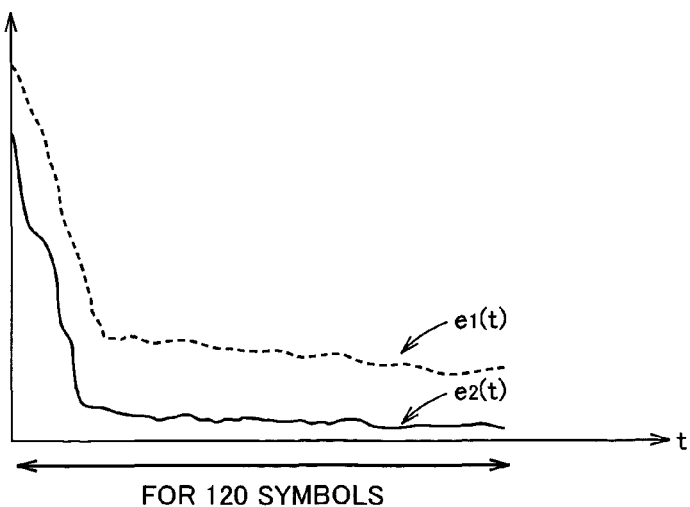
FIG. 8 shows a change of error e(t) during one slot.

FIG. 8 shows a change of error over time in one slot (corresponding to 120 symbols). As shown in FIG. 8, error e1(t) in poor communication environment is greater in size than error e2(t) in good communication environment. Thus, it will be desirable to refrain from conducting error correction when the error is large, since the communication environment is poor and thus the frequency of miscorrection will be high.

Returning to FIG. 6, average error calculation unit 25 obtains error e(t) from weight calculator 44, calculates an average value of error e(t) in one slot (for 120 symbols), and outputs the same as an average error to error correction control unit 23.

Error correction control unit 23 sends an instruction to perform error correction to error correction unit 9 when the remainder sent from error detection unit 8 is not 0 (i.e., there is an error) and when the average error sent from average error calculation unit 25 is not greater than a prescribed value β. This is because when the average error is not greater than the prescribed value β, the communication environment is considered to be good, and the noise superimposed on the received signal is supposed to be small, so that the probability of miscorrection will be low. On the other hand, error correction control unit 23 sends an instruction not to perform error correction to error correction unit 9 when the remainder sent from error detection unit 8 is 0 or when the average error sent from average error calculation unit 25 exceeds the prescribed value β, since when the average error exceeds the prescribed value β, the communication environment is considered to be poor, the noise amount superimposed on the received signal must be large, and the probability of miscorrection will be high.

(Operation)

Hereinafter, an operation of radio communication apparatus 200 for error correction processing will be described.

Figure 9:
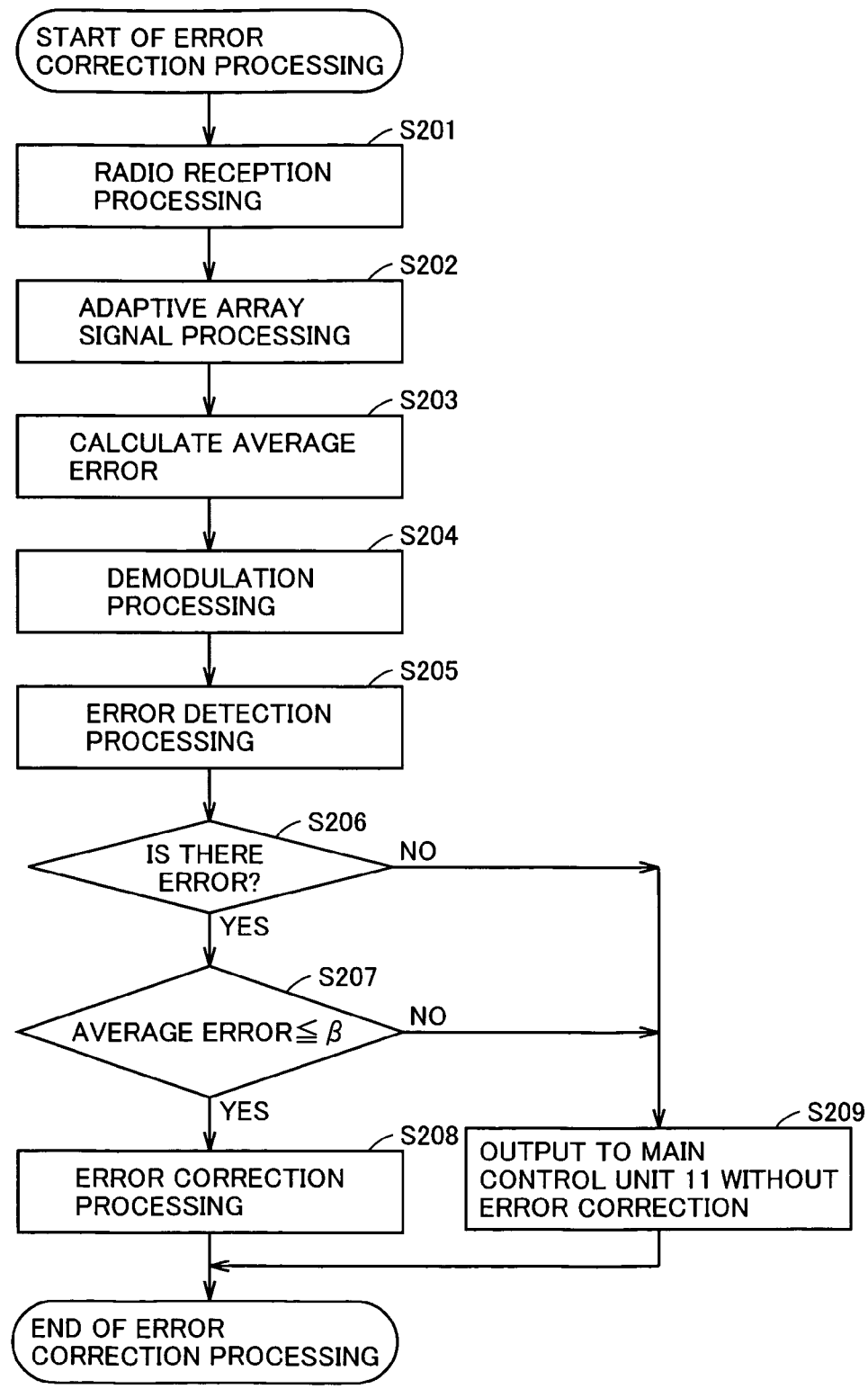
FIG. 9 is a flowchart illustrating operation procedure of error correction processing of radio communication apparatus 200.

FIG. 9 is a flowchart illustrating operation procedure of the error correction processing of radio communication apparatus 200. Referring to FIG. 9, firstly, reception units 3a, 3b perform processing such as amplification and frequency conversion on RF signals received at antennas 1a, 1b, respectively, and output the resulting signals to adaptive array signal processing unit 24 (S201).

Adaptive array signal processing unit 24 performs adaptive array processing on the received signals provided from reception units 3a, 3b, and outputs the resulting signals to modulation/demodulation unit 6 (S202).

Average error calculation unit 25 obtains error e(t) from weight calculator 44, calculates an average value of error e(t) in one slot, and outputs the same as an average error to error correction control unit 23 (S203).

Next, modulation/demodulation unit 6 performs demodulation processing of the π/4 shift QPSK scheme on the signal output from adaptive array signal processing unit 24, and outputs the demodulated signal to correction processing unit 7 (S204).

Error detection unit 8 divides the demodulated signals of one slot output from modulation/demodulation unit 6 by the generative polynomial $G(x)=(x^{16}+x^{12}+x^{5}+1)$, and outputs the remainder to error correction control unit 23 (S205).

Error correction control unit 23 sends an instruction to perform error correction to error correction unit 9 when the remainder sent from error detection unit 8 is not 0 and when the average error sent from average error calculation unit 25 is not greater than the prescribed value β. Upon receipt of the instruction to perform error correction from error correction control unit 23, error correction unit 9 performs error correction on the demodulated signals of one slot output from modulation/demodulation unit 6, and outputs the demodulated signals of one slot having undergone the error correction to main control unit 11 (S206, S207, S208).

When the remainder sent from error detection unit 8 is 0 or when the average error sent from average error calculation unit 25 exceeds the prescribed value β, error correction control unit 23 sends an instruction not to perform error correction to error correction unit 9. Upon receipt of the instruction not to perform error correction from error correction control unit 23, error correction unit 9 refrains from conducting error correction on the demodulated signals of one slot output from modulation/demodulation unit 6, and outputs the signals as they are to main control unit 11 (S206, S207, S209).

As described above, according to the present embodiment, focusing on the fact that as the error between the reference signal and the extracted received signal from a desired radio communication apparatus in adaptive array processing is greater, the communication environment is poorer and thus miscorrection is more likely to occur, radio communication apparatus 200 is configured to perform error correction only when an error is detected and when the average error is not greater than a prescribed value β. As such, the frequency of miscorrection is reduced.

Third Embodiment

The present embodiment pertains to a radio communication apparatus that performs control of error correction in accordance with a data type of a received signal.

(Configuration)

Figure 10:
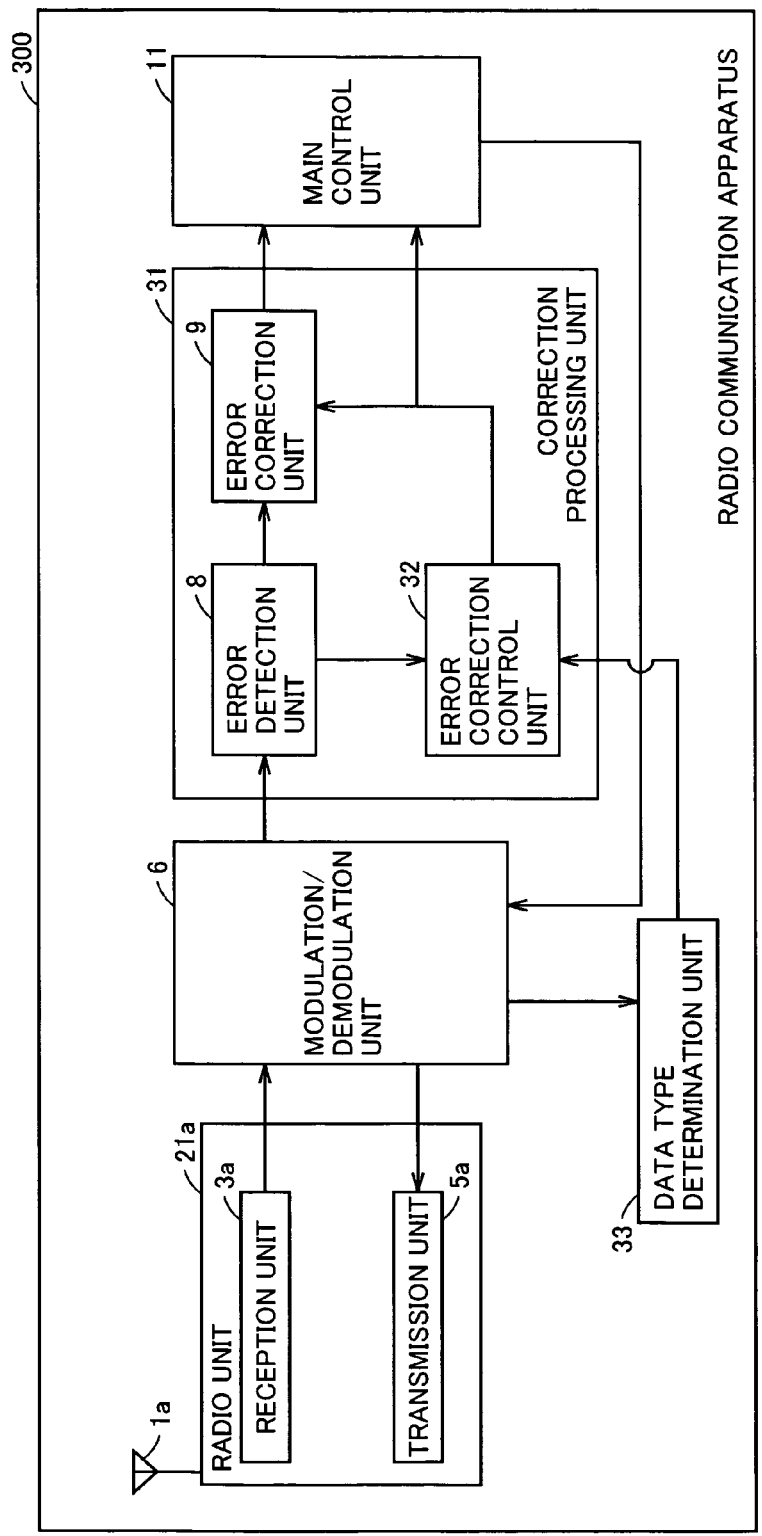
FIG. 10 is a block diagram showing a configuration of a radio communication apparatus 300 according to a third embodiment of the present invention.

FIG. 10 is a block diagram showing a configuration of a radio communication apparatus 300 according to the present embodiment. Referring to FIG. 10, radio communication apparatus 300 includes an antenna 1a, a radio unit 21a, a modulation/demodulation unit 6, a correction processing unit 31, a data type determination unit 33, and a main control unit 11. Radio unit 21a includes a reception unit 3a and a transmission unit 5a. Correction processing unit 31 includes an error detection unit 8, an error correction unit 9, and an error correction control unit 32. A DSP performs the processing of modulation/demodulation unit 6, data type determination unit 33, correction processing unit 31 and main control unit 11, by software. Specifically, the DSP reads and executes a program from a memory (not shown). The program may externally be installed.

Of these components, reception unit 3a, transmission unit 5a, modulation/demodulation unit 6, error detection unit 8, error correction unit 9 and main control unit 11 are identical to those of the first embodiment shown in FIG. 4, and thus, description thereof is not repeated. Hereinafter, the components different from those of the first embodiment will be described.

Data type determination unit 33 obtains a demodulated slow associated control channel (SACCH) or fast associated control channel (FACCH) at the phase of service channel establishment, and based thereon, determines a data type of the data transferred via traffic channel TCH.

Figure 11:
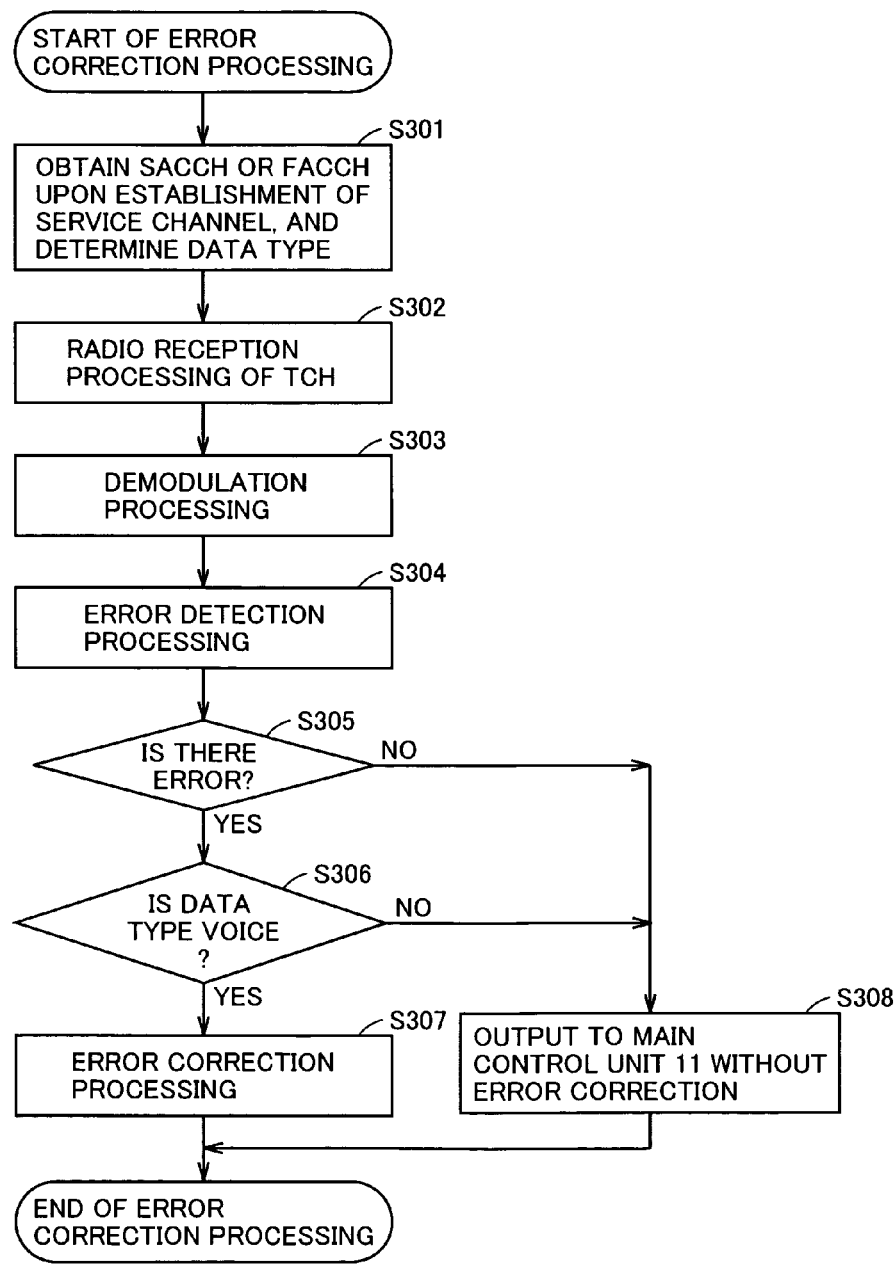
FIG. 11 shows a bit configuration of a FACCH (Fast Associated Control Channel).
Figures 13, 14:
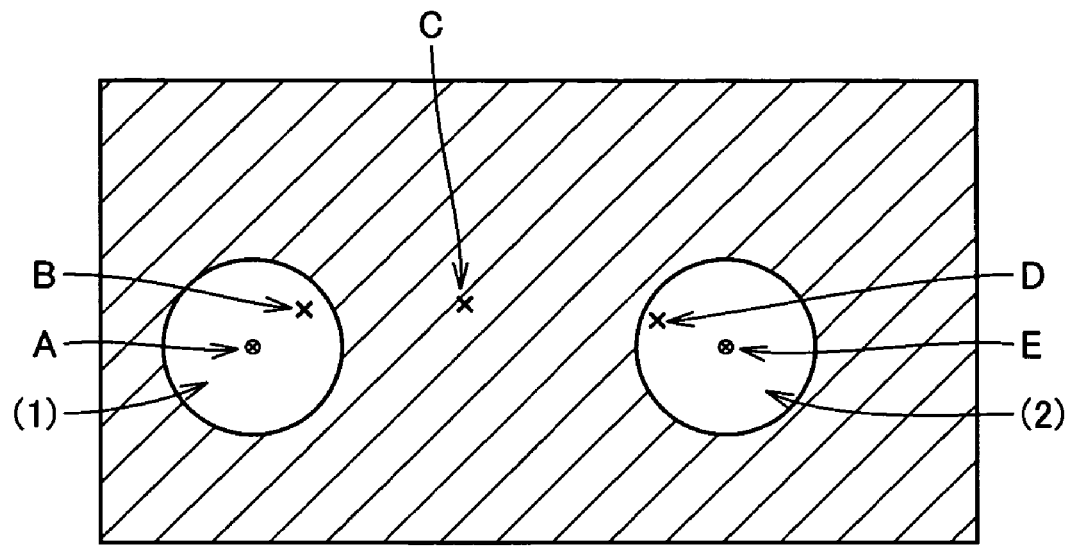
FIG. 13 shows a part of a space of a received signal.
FIG. 14 shows presence/absence of an error and success/failure of recognition of the error in a signal received at respective signal points, for two cases of performing and not performing error correction.

FIG. 11 shows a bit configuration of the FACCH. Referring to FIG. 11, the data transferred via traffic channel TCH is voice when 5 bits indicating information transmitting capability are all 0. Otherwise, the data is other than voice.

Data type determination unit 33 sends the determined data type to error correction control unit 32.

Description is now made as to an adverse effect of miscorrection depending on a data type of the received signal. In the case where the data type of the received signal is other than voice, which may be control data, for example, miscorrection may well result in trouble in processing at a reception device. Since it is generally unnecessary to obtain such control data exactly in real time, it is often the case that the receiver side may instruct the sender side to retransmit the control data and then perform processing based on the retransmitted data.

On the other hand, when the data type of the received signal is voice, miscorrection will not affect the data much. For example, even if a bit of information portion within the traffic channel is erroneously corrected by miscorrection, only a part of the voice corresponding to 5 msec is reproduced incorrectly (i.e., in PHS, data of one slot is decoded to produce voice data of 5 msec), which will not cause much trouble. Further, since it is highly required to reproduce voice in real time, it is inappropriate to pause during reproduction to instruct the sender side to retransmit the voice.

Based on the foregoing, error correction control unit 32 controls error correction based on the data type of the received signal sent from data type determination unit 33. More specifically, error correction control unit 32 sends an instruction to perform error correction to error correction unit 9 when the remainder sent from error detection unit 8 is not 0 (i.e., there is an error) and when the data type sent from data type determination unit 33 is voice. When the remainder sent from error detection unit 8 is 0 (i.e., there is no error) or when the data type sent from data type determination unit 33 is other than voice, error correction control unit 32 sends an instruction to refrain from conducting error correction to error correction unit 9.

(Operation)

Hereinafter, an operation of radio communication apparatus 300 for error correction control will be described.

FIG. 12 is a flowchart illustrating operation procedure of the error correction processing of radio communication apparatus 300. Referring to FIG. 12, firstly, at the time of service channel establishment, reception unit 3a performs radio reception processing such as amplification and frequency conversion on an RF signal of SACCH or FACCH received at antenna 1a, and outputs the resulting signal to modulation/demodulation unit 6. Modulation/demodulation unit 6 performs demodulation processing of the π/4 shift QPSK scheme on the signal output from reception unit 3a, and sends the demodulated signal to data type determination unit 33. Data type determination unit 33 obtains the demodulated SACCH or FACCH, and based thereon, determines the data type of the data transferred through the TCH, and sends the determined data type to error correction control unit 32 (S301).

Reception unit 3a performs radio reception processing such as amplification and frequency conversion on the RF signal of the TCH received at antenna 1a, and outputs the resulting signal to modulation/demodulation unit 6 (S302).

Next, modulation/demodulation unit 6 performs demodulation processing of the π/4 shift QPSK scheme on the signal output from reception unit 3a, and outputs the demodulated signal to correction processing unit 7 (S303).

Error detection unit 8 divides the demodulated signals of one slot output from modulation/demodulation unit 6 by the generative polynomial $G(x)=(x^{16}+x^{12}+X^5+1)$, and outputs the remainder to error correction control unit 32 (S304).

Error correction control unit 32 sends an instruction to perform error correction to error correction unit 9 when the remainder sent from error detection unit 8 is not 0 (i.e., there is an error) and when the data type sent from data type determination unit 33 is voice. Upon receipt of the instruction to perform error correction from error correction control unit 32, error correction unit 9 performs error correction on the demodulated signals of one slot output from modulation/demodulation unit 6, and outputs the demodulated signals of one slot having undergone the error correction to main control unit 11 (S305, S306, S307).

When the remainder sent from error detection unit 8 is 0 (i.e., there is no error) or when the data type sent from data type determination unit 33 is other than voice, error correction control unit 32 sends an instruction not to perform error correction to error correction unit 9. Upon receipt of this instruction, error correction unit 9 refrains from conducting error correction on the demodulated signals of one slot output from modulation/demodulation unit 6, and outputs the same as they are to main control unit 11 (S305, S306, S308).

As described above, according to the present embodiment, focusing on the fact that miscorrection will not cause much trouble when the data type of the received signal is voice and real time reproduction is desired for the voice, radio communication apparatus 300 is configured to perform error correction only when an error is detected and when the data type is voice. This can suppress the adverse effect of miscorrection.

(Modifications)

The present invention is not limited to the above-described embodiments, but rather includes the following modifications.

(1) Calculation of Average Error

In the second embodiment, average error calculation unit 25 calculates as an average error an average value of error e(t) in one slot (for 120 symbols). The present invention however is not limited thereto. For example, it is possible to calculate as the average error an average value of error e(t) for some symbols in the last half from among the 120 symbols.

(2) Data Type

In the third embodiment, error correction is performed only when an error is detected and when the data type of the received signal is voice. The present invention however is not limited thereto. The data type with which error correction will be conducted when an error is detected may be selected in accordance with the application of the communication system. For example, when the data type is a moving image, miscorrection will not affect the data much, and real time reproduction is highly required. In this case, error correction may be performed upon detection of an error. Even in the case of a static image, if miscorrection will not cause much trouble and real time reproduction is highly required, error correction may be performed when an error is detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio communication apparatus, comprising:
   a determination unit for electronically determining a data type of an antenna signal;
   an error detection unit for performing error detection of said received antenna signal; and
   a correction unit for electronically performing error correction of said received antenna signal only when said error detection unit detects an error and when the data type determined by said determination unit corresponds to a predetermined type;
   said radio communication apparatus being configured with computer code to instruct the sender side to retransmit a signal corresponding to said received antenna signal when said error detection unit detects an error and when the data type determined by said determination unit does not correspond to the predetermined type;
   said received antenna signal of the predetermined type has less adverse effects of miscorrection than said received antenna signal of the non-predetermined type.

2. The radio communication apparatus according to claim 1, wherein said predetermined type is voice.

3. The radio communication apparatus of claim 1, further comprising:
   a radio unit for receiving and transmitting antenna signals; and
   a modulation/demodulation unit for processing received antenna signals from the radio unit and processing signals to be transmitted by the radio unit.

4. An error correction method for performing error correction of a received signal in a radio communication apparatus, comprising the steps of:
   determining a data type of an antenna signal in the radio communication apparatus;
   performing error detection of said received antenna signal;
   performing electronically error correction of said received antenna signal only when said error is detected and when said determined data type corresponds to a predetermined type; and
   instructing the sender side to retransmit a signal corresponding to said received antenna signal when said error is detected and when said determined data type does not correspond to the predetermined type;
   said received antenna signal of the predetermined type has less adverse effects of miscorrection than said received antenna signal of the non-predetermined type.

5. The error correction method according to claim 4, wherein said predetermined type is voice.

6. A non-transmissible computer readable medium encoded with an error correction program for performing error correction of a received signal in a radio communication apparatus, the program when executed causing a computer to perform the steps of:
   determining a data type of an antenna signal in the radio communication apparatus;
   performing error detection of said received antenna signal;
   performing error correction of said received antenna signal only when said error is detected and when said determined data type corresponds to a predetermined type; and
   instructing the sender side to retransmit a signal corresponding to said received antenna signal when said error is detected and when said determined data type does not correspond to the predetermined type;
   said received antenna signal of the predetermined type has less adverse effects of miscorrection than said received antenna signal of the non-predetermined type.

7. The computer readable medium encoded with an error correction program according to claim 6, wherein said predetermined type is voice.

* * * * *